United States Patent [19]

Richardson

[11] 4,404,563

[45] Sep. 13, 1983

[54] SYSTEM OF DIRECTIONAL ANTENNAS WITH MEANS FOR REDUCING FLUTTER

[75] Inventor: Roy A. Richardson, Skokie, Ill.

[73] Assignee: Motorola, Inc., Schaumburg, Ill.

[21] Appl. No.: 206,217

[22] Filed: Nov. 12, 1980

[51] Int. Cl.³ .............................................. H04B 7/00
[52] U.S. Cl. ................................ 343/100 SA; 455/137
[58] Field of Search .................... 343/100 SA, 106 R; 455/137, 273

[56] References Cited

U.S. PATENT DOCUMENTS

| | | | |
|---|---|---|---|
| 3,044,063 | 7/1962 | Russell | 343/100 SA |
| 3,140,490 | 7/1964 | Sichak et al. | 343/100 SA |
| 3,438,044 | 4/1969 | Elia et al. | 343/100 SA X |
| 3,482,245 | 12/1969 | Parquier | 343/100 |
| 3,560,978 | 2/1971 | Himmel et al. | 343/100 SA X |
| 3,560,985 | 2/1971 | Lyon | 343/853 |
| 3,743,941 | 7/1973 | Gans et al. | 325/305 |
| 3,745,580 | 7/1973 | Burnham | 343/100 SA |
| 3,750,175 | 7/1973 | Lockerd et al. | 343/100 SA |
| 3,803,613 | 4/1974 | Wright | 343/113 R |
| 3,824,531 | 7/1974 | Walsh | 340/3 R |
| 4,017,867 | 4/1977 | Claus | 343/854 |
| 4,027,247 | 5/1977 | Aranguren | 325/305 |
| 4,034,374 | 7/1977 | Kruger | 343/16 R |
| 4,074,266 | 2/1978 | Yokoi et al. | 343/100 SA |
| 4,166,274 | 8/1979 | Reudink et al. | 343/100 SA |

Primary Examiner—Theodore M. Blum
Attorney, Agent, or Firm—Donald B. Southard; James W. Gillman; Donald P. Reynolds

[57] ABSTRACT

Flutter in received radio signals at and above 150 MHz is reduced by a system having a plurality of directional antennas with receiving patterns that can be caused to rotate to sweep in azimuth. The antenna that receives the strongest signal is stopped from sweeping until another antenna receives a stronger signal, at which time it is stopped from sweeping and the antenna that was stopped is swept. Signals from all antennas are combined in a maximal-ratio diversity receiver to provide a combination of the signals that is additive regardless of their relative phase.

17 Claims, 7 Drawing Figures

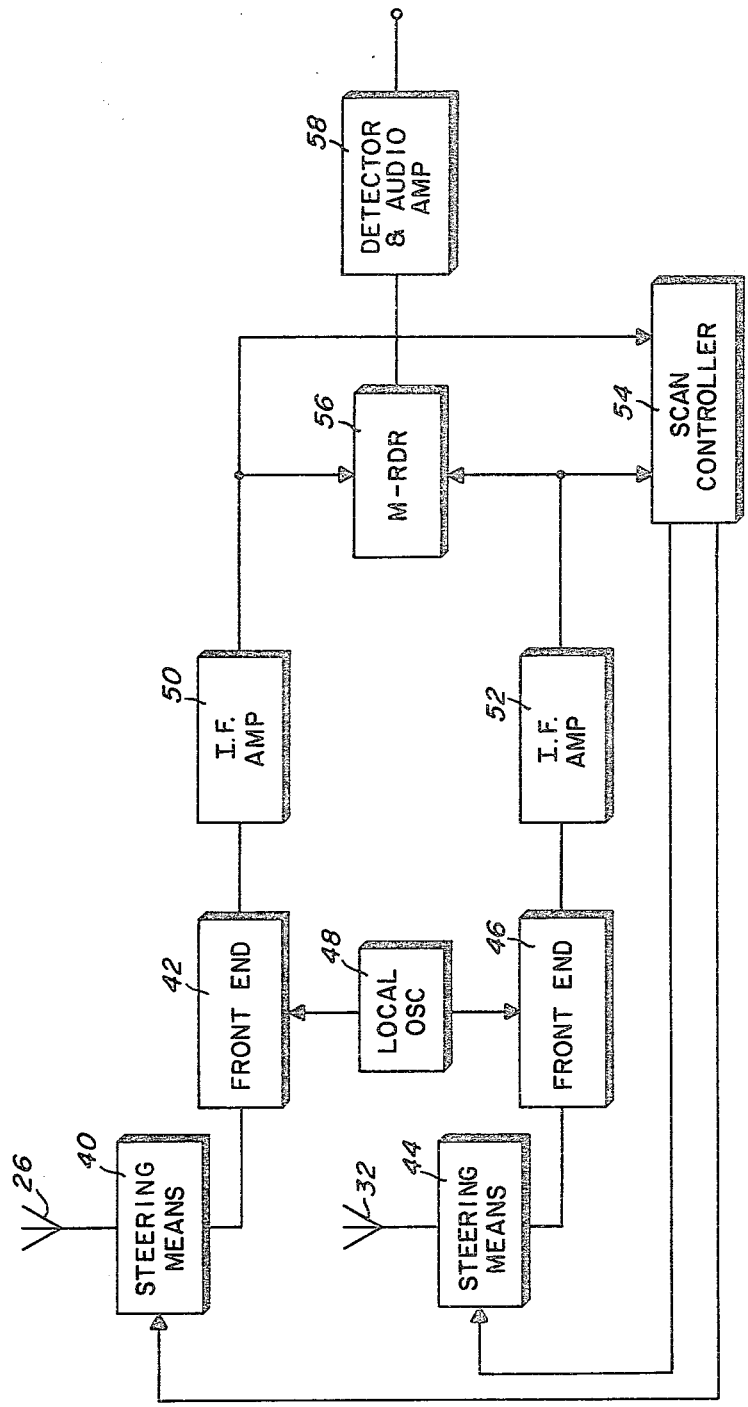

SYSTEM OF DIRECTIONAL ANTENNAS WITH MEANS FOR REDUCING FLUTTER

BACKGROUND OF THE INVENTION

This invention relates to radio receiving antennas. In particular, it relates to a system for reducing flutter in receiving radio transmissions.

Flutter is a noticeable variation in the audio signal developed by a radio receiver. Flutter results from the fact that the typical radio antenna receives signals that are reflected from various objects. The reflections may be in addition to a signal received over a direct path or, in the case of a receiver that is shielded by some object from a direct path to the transmitter, the entire communication may result from reflected signals. Flutter occurs when relative motion among a transmitter, the receiver and one or more reflecting objects causes variation in the net signal developed on the receiving antenna. That signal may be caused to be low by the superposition of signals that are 180° out or nearly 180° out of phase. If relative motion causes the signals to go in and out of phase at an audible rate, then the appearance and disappearance of the signal in the receiver will cause a fluttering of the audible signal. The flutter interferes with communication because it is caused by the existence of time intervals, normally randomly spaced, in which quieting is reduced or lost in FM receivers and in which the gain of the AGC in an AM receiver is caused to approach its maximum value. Either of these conditions causes an audible noise burst.

It should also be evident that the phenomenon of flutter is related to the frequency of the signal that is received, since a change in position of a quarter wavelength will cause a change from a maximum to a minimum of a received signal. A change of a half wavelength will cause a reversal of phase. For this reason flutter begins to become of concern at broadcast frequencies of the order of 150 MHz, with a free-space wavelength of 2 meters. It is more of a problem for communication at frequencies of the order of 900 MHz for which the wavelength is about 33 centimeters. Frequencies above 900 MHz have not been used extensively for mobile and portable communications systems, but will present increasing problems with flutter when they are used.

Mobile and portable communications systems almost invariably use omnidirectional antennas because receivers in such systems are often in positions where the only signal they can receive is reflected. This is in contrast to communication between fixed stations in which the combination of directivity and high gain associated with directional antennas minimizes or eliminates the problem of flutter. The term "omnidirectional" is here used to refer to an antenna that has no favored azimuthal angles although it may well be limited to elevation angles that exclude a considerable cone about the zenith. Because these antennas are omnidirectional in azimuth, they combine relatively low gain with the possibility of superposing a plurality of reflected signals. Thus they are subject to flutter.

It is an object of the present invention to reduce flutter in radio receivers.

It is a further object of the present invention to provide a means of reducing flutter in mobile radios and base-station radios.

It is a further object of the present invention to reduce flutter in radio systems operating at and above 150 MHz.

Other objects will become apparent in the course of a detailed description of the invention.

SUMMARY OF THE INVENTION

An omnidirectional receiving system for frequencies at and above 150 MHz includes a plurality of electronically steerable directional antennas. Signals from all of the antennas are coupled to a diversity receiver which produces a combined signal from the plurality of signals. Signals from the antennas are also compared to provide an indication as to which antenna produces the strongest signal. That antenna is fixed in its receiving direction, while the directional patterns of all other antennas are rotated in azimuth at a convenient frequency. If a rotating antenna encounters a signal that is stronger than the signal received by the antenna that is not rotating, it is stopped on the stronger signal and the formerly fixed antenna is caused to rotate.

BRIEF DESCRIPTION OF THE DRAWINGS

FIG. 2 is a functional block diagram of an apparatus for the practice of the present invention.

DETAILED DESCRIPTION OF THE INVENTION

Figure 1:
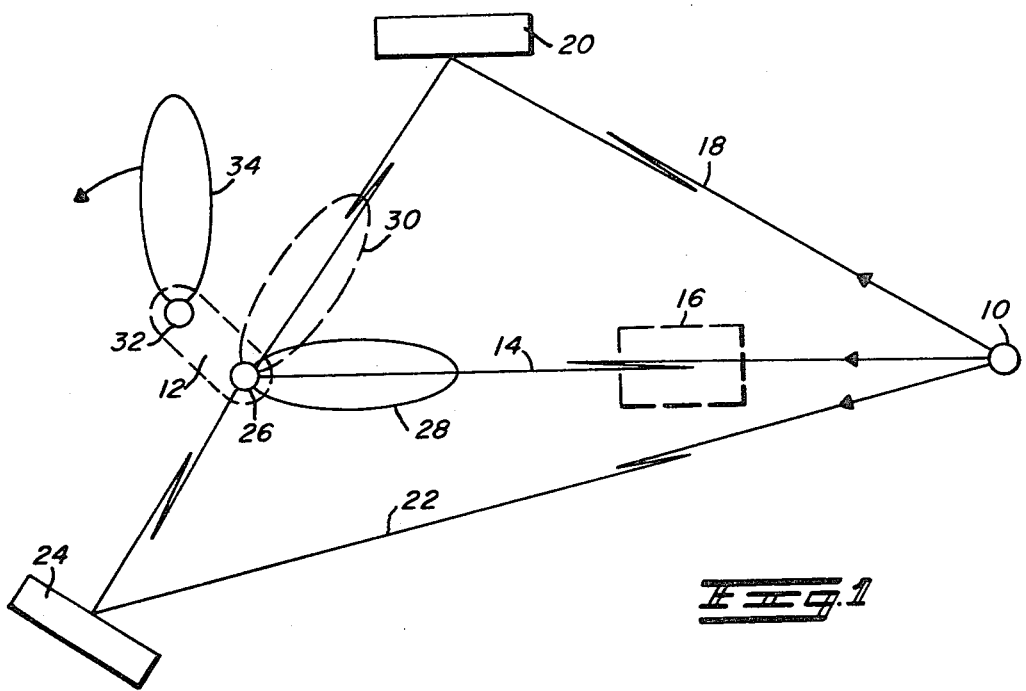
FIG. 1 is a plan view of a typical placement of antennas and obstructions to illustrate the practice of the present invention.

FIG. 1 is a plan view of a typical array of antennas at transmitting and receiving sites with obstructions and reflections. In FIG. 1 a transmitting antenna 10 is broadcasting radio signals that are to be received at a receiving antenna 12. A direct path 14 will usually provide the strongest received signal at receiving antenna 12, but such a path is often blocked as by obstruction 16. When this happens, communication can often be continued with a reflected signal 18 that reflects from an object such as reflector 20. Another reflected signal 22 is shown as reflecting from a reflector 24.

If transmitting antenna 10 and receiving antenna 12 were at fixed stations, than it would be possible to maximize the probability of effective communication between them by using a directional configuration at transmitting antenna 10 and directing a beam at receiving antenna 12. Similarly, a directive antenna used as receiving antenna 12 could be aimed at the transmitting antenna 10 to maximize the compounded antenna gain. Then only the encroachment of an obstruction such as obstruction 16 in the path would interfere with communication between transmitting antenna 10 and receiving antenna 12, and few obstructions that are big enough to interfere with communication are readily movable.

The situation changes when transmitting antenna 10, receiving antenna 12, or both, are movable. It then becomes undesirable or, at least, very complicated to use directional antennas for communication. If transmitting antenna 10 and receiving antenna 12 are made omnidirectional, their gain decreases and their susceptibility to interference from reflected signals increases. It should be evident from an inspection of FIG. 1 that if the paths of reflected signals 18 and 22 of FIG. 1 differ in length by an odd number of half wavelengths of the broadcast signal, then the net signal received at receiving antenna 12 will be their algebraic sum which approaches zero. In particular, if there is relative motion among transmitting antenna 10, receiving antenna 12 and reflectors 20 and 24, then the combined signal received at receiving antenna 12 has the possibility of being alternately the sum of two signals that are in phase and the sum of two signals that are out of phase. When such signals go in and out of phase at a frequency that is in the audible range, the perceived result in a receiver is called flutter. This is clearly undesirable as the portions of the signal that are out of phase represent an informational part of a message that is lost and replaced by short bursts of noise.

One way to minimize the subtraction of components of a received signal that are out of phase is to use a directional antenna to discriminate against all the components but one. However, if relative motion among antennas and reflectors causes a received signal to decrease, it will be necessary to shift to another reflected wave or to a direct wave to avoid losing communication. This is accomplished in FIG. 1 by making receiving antenna 12 of two steerable directional antennas. In FIG. 1, first steerable directional antenna 26 is shown with a directional pattern 28 that is aimed to receive a signal on direct path 14. A dotted directional pattern 30 is shown so placed as to receive reflected signal 18. When first steerable directional antenna 26 is stopped in either of these directions, second steerable directional antenna 32 is caused to sweep its directional receiving pattern 34 at some given frequency, preferably about 1 KHz. That sweep will continue until the circuitry that will be described later indicates that the second steerable directional antenna 32 is receiving a stronger signal than the first steerable directional antenna 26. At this point the second steerable directional antenna 32 is caused to stop rotating and to lock on the received signal while first steerable directional antenna 26 is caused to sweep. This process is repeated with one antenna being locked on a particular signal until the other detects a stronger signal and is itself locked on the stronger signal.

If the signals received on the two antennas as described above were combined by simple addition, the possibility would still exist of flutter through simple addition of signal components that were in and out of phase. However, that possibility is eliminated by the circuit of FIG. 2, which is a functional block diagram of an apparatus for combining the two signals received in FIG. 1 into a single output signal. Ideally, any such combination should be dominated by the stronger signal, and it should switch smoothly from one signal to another without losing synchronism. These results are achieved by the circuit of FIG. 2 in which first steerable directional antenna 26 is connected through first steering means 40 to a diversity receiver 56. Similarly, second steerable directional antenna 28 is connected through second steering means 44 to the diversity receiving 56. If the signals from antennas 26 and 32 are sufficiently strong, they may be applied directly to maximal-ratio diversity receiver 56. If the signals from antennas 26 and 32 are at a frequency that is appropriate to be applied to the maximal-ratio diversity receiver 56 but are too weak, they may be amplified before being applied to maximal-ratio diversity receiver 56. If the signals from antennas 26 and 32 are not at a convenient frequency, they may be changed to a different frequency. The possibility of both amplification and frequency change is included in the preferred embodiment of FIG. 2, in which the signal from antenna 26 is coupled to front end 42 and the signal from antenna 32 is coupled to front end 46. Front ends 42 and 46 both include mixers, and they may include one or more stages of RF amplification. A local oscillator 48 is connected to both front ends 42 and 46 to produce IF output signals from front ends 42 and 46 that are synchronized to each other. The output of front end 42 is coupled to IF amplifier 50, which includes filtering means to select a desired frequency band and contains enough stages of IF amplification to provide a desired signal level. The output of front end 46 is taken to an IF amplifier 52 which provides similar filtering and amplification. The outputs of IF amplifiers 50 and 52 are taken to a scan controller 54 to control steering means 40 and 44. Those outputs are also coupled to maximal-ratio diversity receiver 56, which produces an output that is detected and converted to an audible or otherwise usable signal in detector and audio amplifier 58.

Figure 3:
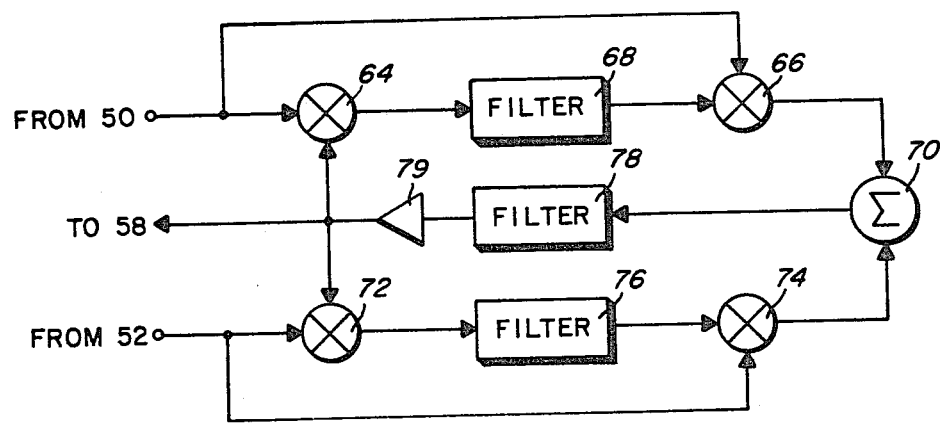
FIG. 3 is an expanded functional block diagram of a maximal-ratio diversity receiver.

FIG. 3 is an expanded functional block diagram of a maximal-ratio diversity receiver that is similar to one disclosed in U.S. application Ser. No. 22,757, assigned to the assignee of the present application. In FIG. 3 an input signal is connected to mixer 64 and also to mixer 66. The input signal is shown as coming from IF amplifier 50 of FIG. 2, as in the preferred embodiment, but it should be understood that the signal might come from an amplifier at signal frequency or directly from antenna 26 as described above. The output of mixer 64 is filtered in bandpass filter 68 and is then taken as a second input to mixer 66. The output of mixer 66 is supplied as one input to summer 70. Similarly, the output of IF amplifier 52 is connected as an input to mixer 72 and also as an input to mixer 74. The output of mixer 72 is filtered in bandpass filter 76 and is then applied as an input to mixer 74. The output of mixer 74 is connected to summer 70 where it is added to the output of mixer 66. The sum of these inputs is the output of summer 70 which is filtered in bandpass filter 78 and applied as an input to mixers 65 and 72 after amplifying and limiting in amplifier 79. The output of amplifier 79 is also the output of maximal-ratio diversity receiver 56. The output is connected to detector and audio amplifier 58 for recovery of transmitted information. Operation of the circuit of FIG. 3 may be understood by noting that it comprises two paralleled receivers, each having two stages of frequency conversion, in which the outputs of both second stages of frequency conversion are added and filtered to provide the common local oscillator for both first stages of frequency conversion. Referring to FIG. 3, the signals arriving from IF amplifiers 50 and 52 will, in general, be synchronized in frequency but different in phase. Those signals will contain the applied modulation. Thus, the inputs from IF amplifiers 50 and 52 to mixers 64, 66, 72 and 74 all contain modulation.

It will normally be desirable to make bandpass filters 68 and 76 so that they pass the difference frequency between the IF signal entering the mixer 64 from IF amplifier 50 and the local oscillator signal that comes to mixer 64 from filter 78. The same is true with respect to mixer 72 and filter 76. Thus, mixers 64 and 72 with their associated filters 68 and 76 are down-converters. In this case, assuming that the output of filter 78 contains modulation at the IF frequency, the difference signal entering bandpass filters 68 and 76 will contain no modulation because it is tuned to the difference frequency. Thus, the inputs to mixers 66 and 74 will each comprise one down-converted signal containing no modulation and one IF signal containing modulation. Mixers 66 and 74 are caused to be up-converters in that their outputs, after being combined in summer 70, are passed through bandpass filter 78 which sums the signals applied to mixers 66 and 74. This sum contains the modulation of each of the signals from IF amplifiers 50 and 52, and it is at a frequency in the passband of bandpass filter 78. It can be shown that the combined signal that is the output of filter 78 is dominated by the signal from IF amplifier 50 or 52 that has the maximal signal and that through the signals from IF amplifiers 50 and 52 may differ in phase because of differing path lengths that their broadcast signals may have followed, the combined signal that is the output of filter 78 assumes a phase angle that combines the signals additively.

Figure 4:
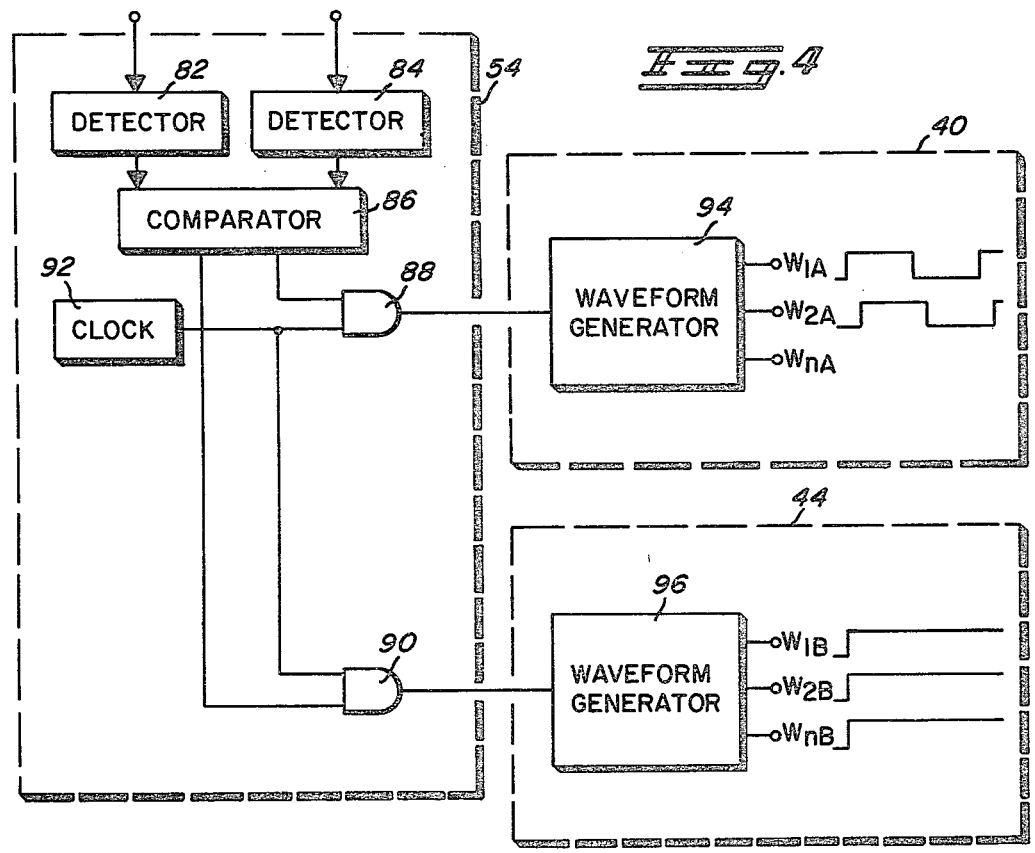
FIG. 4 is an expanded functional block diagram of the scan controller and antenna steering systems of FIG. 2.

FIG. 4 is an expanded functional block diagram of the scan controller 54 and steering means 40 and 44 of FIG. 2. In FIG. 4, a signal from IF amplifier 50 or one of the alternatives that is supplied as one input to maximal-ratio diversity receiver 56 of FIG. 2 is connected to detector 82 of FIG. 4. Similarly, a signal from IF amplifier 52 or its equivalent is connected to detector 84. Outputs of detectors 82 and 84 are connected to comparator 86, which generates an output at AND gate 88 if detector 82 produces a smaller signal and generates a signal at AND gate 90 if detector 84 produces a smaller signal. A clock 92 is connected to AND gates 88 and 90, and the one of AND gates 88 and 90 that is caused to open will pass a clock pulse. This combination of components comprises scan controller 54 of FIG. 2. The output of AND gate 88 of FIG. 4 is taken to first steering means 40, and the output of AND gate 90 is taken to second steering means 44. In first steering means 40, a waveform generator 94 is enabled when it receives a signal from an AND gate 88. Waveform generator 94 then produces a sequence of square waves as indicated with each successive square wave delayed in time by one-eighth of a period from its predecessor, to be connected to successive reflecting elements 106 of FIG. 6. While waveform generator 94 is thus enabled, waveform generator 96 will not be enabled and, therefore, will generate a number of outputs that are either high or low depending on where those outputs were when waveform generator 96 was last enabled. Waveform generator 94 is thus producing a sweeping pattern and waveform generator 96 is producing a stationary pattern in the situation shown in FIG. 4.

Figures 5, 6:
FIG. 5 is a schematic of the interconnections of an antenna reflecting element of the present invention.
FIG. 6 is a combined plan and elevation of a typical antenna for the practice of the present invention.

FIG. 5 is a schematic view of an antenna reflecting element 106 and the components connected to it. In FIG. 5 an RF choke 102 is connected to receive a signal from either waveform generator 94 or waveform generator 96. The signal passing through RF choke 102 is applied to PIN diode 104 to cause it either to conduct or not conduct. PIN diode 104 is also connected to antenna reflecting element 106. When PIN diode 104 conducts, antenna element 106 is connected to ground and is, therefore, made effective as a reflecting element. When PIN diode 104 is caused to be a relatively high impedance, antenna reflecting element 106 floats electrically and is thus not effective as a reflector.

Figure 7:
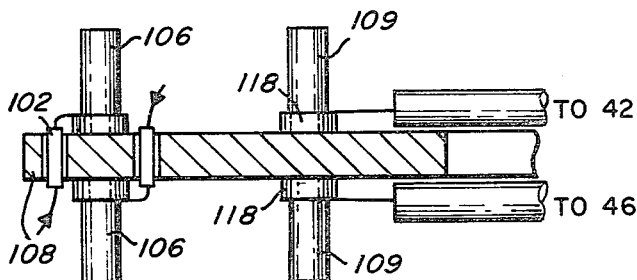
FIG. 7 is a partial sectional view taken along section lines 7—7 of FIG. 6.

The arrangement of antenna reflecting elements 106 is shown in FIG. 6 which is a combined plan view and elevation of a typical pair of steerable directional antennas. In FIG. 6 a plurality of antenna reflecting elements 106 is disposed in two circular arrays, one above and one below a ground plane 108. The center of the circular pattern contains two antenna elements 109 that are not switched by PIN diodes but that are allowed to receive at all times. This is shown in more detail in FIG. 7 which is a partial sectional side view along section lines 7—7 of FIG. 6. FIG. 7 also shows the centrally located antenna elements 109 that are above and below ground plane 108. Antenna reflecting elements 106 are connected through PIN diodes 104 to ground at ground plane 108. In contrast, antenna elements 109 are mounted physically to ground plane 108 but are insulated electrically from it by standoffs 118. When a PIN diode 104 is caused by its switching waveform from waveform generator 94 or 96 to be a high impedance, the associated antenna reflecting element 106 is made ineffective electrically. When a PIN diode 104 is switched to a low impedance, its associated antenna reflecting element is made effective as a reflector, reflecting signals to its antenna element 109. Signals from antenna elements 109 are combined to be supplied as inputs to maximal-ratio diversity receiver 56 of FIG. 2. The condition that was assumed in the drawing of FIG. 4 is that the upper antenna elements, those connected to waveform generator 94, are sweeping, and the lower antenna elements, those connected to waveform 96, are fixed in direction. As has been described, that condition will persist until comparator 86 of FIG. 4 changes polarity and opens AND gate 90, enabling waveform generator 96 and stopping the changes of waveform generator 94.

It should be understood that the steering means and the steerable antennas that are described here are intended as typical. It is likely that some form of electronic sweeping will be necessary, as it would be difficult to start and stop a mechanical sweeping system that could sweep at a rate of 1 KHz. However, any of a wide variety of known electronically steerable antennas could be used, and the generation of sweeping signals to drive and control such patterns can be done in many of a number of ways which are well known.

The operation of the present invention has been demonstrated by the use of two FM receivers operating at frequencies above 900 MHz. In this demonstration, each receiver had its own directional antenna that was aimed by hand. The output of each FM receiver was taken to a maximal-ratio diversity receiver which provided an output to a detector and audio amplifier. Both of the receiver antennas were placed in a location that was obstructed physically from a transmitting antenna that was broadcasting at their frequency. Rotation of one of the antennas by hand established the fact that a direct signal could not be received, but as many as five or six reflected signals were received depending upon the location of the antennas. The experimental setup made it possible to aim the directional antennas of the individual FM receivers to intercept individual reflected signals. When both antennas were aimed in directions corresponding to these signals and the signals were combined without the maximal ratio diversity receiver, the phasor cancellation of signals that is characteristic of fluttering was observed. When the individual receivers were connected to supply their output to a maximal-ratio diversity receiver, there was no loss of quieting despite the switching from one antenna to another.

I claim:

1. A method of reducing flutter in received radio frequency signal transmissions comprising the steps of:
   a. providing first and second antenna devices having selectable directional receiving patterns;
   b. fixing the receiving pattern of one of the directional receiving antennas to receive a selected signal while sweeping the receiving pattern of the other directional receiving antenna to produce a second signal;
   c. selecting the antenna pattern that is fixed at any particular time as the one producing the stronger signal; and
   d. combining the received signals to produce an output.

2. The method of claim 1 wherein the step of combining the first and second signals comprises applying the first and second signals to a maximal-ratio diversity receiver to produce a combined output.

3. The method of claim 2 comprising in addition the step of detecting the combined output to extract a modulating signal.

4. The method of claim 1 wherein the steps of sweeping as performed at a rate of the order of 1000 revolutions per second.

5. A method of reducing flutter in received radio frequency signal transmissions comprising the steps of:
   a. providing first and second antenna devices having selectable directional receiving patterns;
   b. fixing the receiving pattern of one of the directional receiving antennas to receive a selected signal while sweeping the receiving pattern of the other directional receiving antenna to produce a second signal;
   c. selecting the antenna pattern that is fixed at any particular time as the one producing the stronger IF signal;
   d. mixing each of the received signals from the antennas with a signal from a common local oscillator to produce first and second IF signals; and
   e. combining the first and second IF signals to produce an output.

6. The method of claim 5 wherein the step of combining the first and second signals comprises applying the first and second signals to a maximal-ratio diversity receiver to produce a combined output.

7. The method of claim 6 comprising in addition the step of detecting the combined output to extract a modulating signal.

8. The method of claim 5 wherein the steps of sweeping are performed at a rate of the order of 1000 revolutions per second.

9. A method of reducing flutter in received radio transmissions comprising the steps of:
   a. sweeping a receiving pattern of a first directional receiving antenna in azimuth to receive a first signal;
   b. fixing a receiving pattern of a second directional receiving antenna on a second signal that is stronger than the first signal;
   c. selecting the stronger of the first and second signals;
   d. fixing the receiving pattern of the directional receiving antenna that produces the stronger signal;
   e. sweeping the receiving pattern of the receiving antenna that produces a weaker signal;
   f. mixing the first signal with a signal from a local oscillator to produce a first IF signal;
   g. mixing the second signal with the signal from the local oscillator to produce a second IF signal; and
   h. combining the first and second IF signals at a maximal-ratio diversity receiver to produce an output.

10. The method of claim 9 wherein the steps of sweeping are performed at a rate of the order of 1000 revolutions per second.

11. A method of reducing flutter in received radio transmissions comprising the steps of:
    a. sweeping a receiving pattern of a first directional receiving antenna in azimuth to receive a first signal;
    b. fixing a receiving pattern of a second directional receiving antenna on a second signal that is stronger than the first signal;
    c. mixing the first signal from the first antenna with a signal from a local oscillator to produce a first IF signal;
    d. mixing the second signal from the second antenna with the signal from the local oscillator to produce a second IF signal;
    e. selecting the stronger of the first and second IF signals;
    f. fixing the receiving pattern of the directional receiving antenna that produces the stronger IF signal;
    g. sweeping the receiving pattern of the receiving antenna that produces a weaker IF signal;
    h. applying the first and second signals to a maximal-ratio diversity receiver to produce an output;
    i. detecting the output of the maximal-ratio diversity receiver to extract a modulating signal; and
    j. converting the modulating signal to usable form.

12. An apparatus for minimizing flutter in receiving radio signals, the apparatus comprising:
    a. a first directional receiving antenna having a steerable receiving pattern;
    b. first means connected to the first antenna for rotating in azimuth the steerable receiving pattern of the first antenna;
    c. a second directional receiving antenna having a steerable receiving pattern;
    d. second steering means connected to the second antenna for rotating in azimuth the steerable receiving pattern of the second antenna;
    e. a scan controller connected to the first and second steering means to control steering of the first and second steering antennas;
    f. a maximal-ratio diversity receiver connected to the first and second antennas to receive and combine the signals from the first and second antennas and produce a diversity output signal; and
    g. a detector and amplifier connected to the maximal-ratio diversity receiver to receive the diversity signal and generate from it a usable signal.

13. The apparatus of claim 12 comprising in addition means connected to the maximal-ratio diversity receiver for generating a control signal identifying which one of the first and second antennas is receiving a stronger signal.

14. The apparatus of claim 13 wherein the scan controller is connected to the means for generating a control signal and is responsive to the control signal to fix the receiving pattern of the antenna receiving the stronger signal and to sweep the receiving pattern of the antenna receiving the weaker signal.

15. The apparatus of claim 12 wherein the maximal-ratio diversity receiver comprises:
   a. a first mixer connected to the first antenna and to a local oscillator terminal to produce a multiplied output;
   b. a first bandpass filter connected to the first mixer to receive an output signal from the first mixer and to pass frequencies representing the difference between the signal from the first antenna and the signal from the local oscillator terminal;
   c. a second mixer connected to the first filter and to the first antenna to mix the signal from the first antenna with an output of the first filter to produce a second mixer signal;
   d. a third mixer connected to the second antenna and the local oscillator terminal to produce a product of the signal from the second antenna and the local oscillator signal;
   e. a second bandpass filter connected to the third mixer and receiving an output signal from the third mixer to pass a signal that is a difference of the signal from the second antenna and the local oscillator signal;
   f. a fourth mixer connected to the second filter and the second antenna to produce a product of signals from the second filter and the second antenna;
   g. a summer connected to the second and fourth mixers and receiving as inputs the output signals from the second and fourth mixers, the summer producing as an output the sum of the outputs of the second and fourth mixers; and
   h. a third bandpass filter connected to the summer and to the local oscillator terminal, the third bandpass filter passing a band of frequencies about a desired local oscillator frequency, the band of frequencies being taken as an output of the maximal-ratio diversity receiver.

16. An apparatus for minimizing flutter in receiving radio signals, the apparatus comprising:
   a. a first directional receiving antenna having a steerable receiving pattern;
   b. first means connected to the first antenna for rotating in azimuth the steerable receiving pattern of the first antenna;
   c. a first front end including a first mixer, connected to the first antenna to receive an RF radio signal therefrom;
   d. a second directional receiving antenna having a steerable receiving pattern;
   e. second steering means connected to the second antenna for rotating the steerable receiving pattern;
   f. a second front end including a second mixer connected to the second receiving antenna to receive an RF signal therefrom;
   g. a local oscillator connected to the first and second front end to produce respectively a first and a second IF signal therefrom;
   h. a first IF amplifier connected to the first front end to amplify the first IF signal therefrom;
   i. a second IF amplifier connected to the second front end to amplify the second IF signal therefrom;
   j. a scan controller connected to the first and second IF amplifiers and to the first and second steering means to receive IF signals from the first and second IF amplifiers and control steering of the first and second steering means;
   k. a maximal-ratio diversity receiver connected to the first and second IF amplifiers to receive and combine the first and second IF signals and produce a diversity output signal;
   l. a detector and audio amplifier connected to the maximal-ratio diversity receiver to receive the diversity signal and generate from it an audio signal; and
   m. means for converting the audio signal to usable form.

17. The apparatus of claim 13 wherein the maximal-ratio diversity receiver comprises:
   a. a first mixer connected to the first IF amplifier and to a local oscillator terminal to produce a multiplied output;
   b. a first bandpass filter connected to the first mixer to receive an output signal from the first mixer and to pass frequencies representing the difference between the signal from the first IF and the signal from the local oscillator terminal;
   c. a second mixer connected to the first filter and to the first IF amplifier to mix the signal from the first IF amplifier with an output of the first filter to produce a second mixer signal;
   d. a third mixer connected to the second IF amplifier and the local oscillator terminal to produce a product of the first IF signal and the local oscillator signal;
   e. a second bandpass filter connected to the third mixer and receiving an output signal from the third mixer to pass a signal that is a difference of the second IF signal and the local oscillator signal;
   f. a fourth mixer connected to the second filter and the second IF amplifier to produce a product of signals from the second filter and the second IF amplifier;
   g. a summer connected to the second and fourth mixers and receiving as inputs the output signals from the second and fourth mixers, the summer producing as an output the sum of the outputs of the second and fourth mixers; and
   h. a third bandpass filter connected to the summer and to the local oscillator terminal, the third bandpass filter passing a band of frequencies about a desired local oscillator frequency, the band of frequencies being taken as an output of the maximal-ratio diversity receiver.

* * * * *